L. H. SEUBERT.
ANTIFRICTION BEARING.
APPLICATION FILED MAY 1, 1908.
951,847.
Patented Mar. 15, 1910.
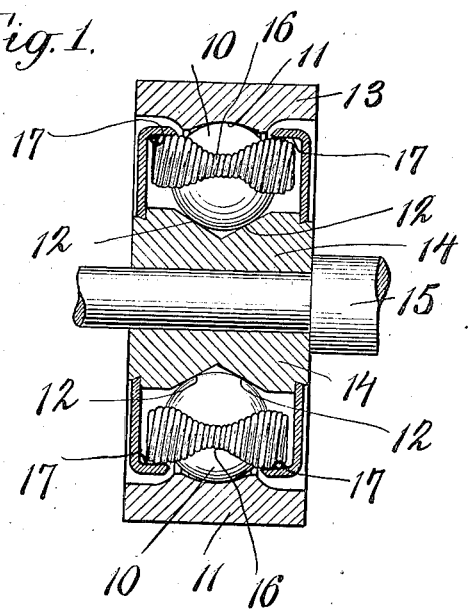
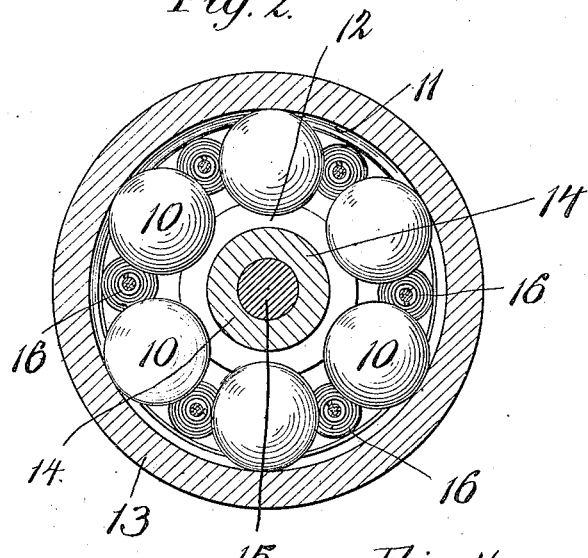
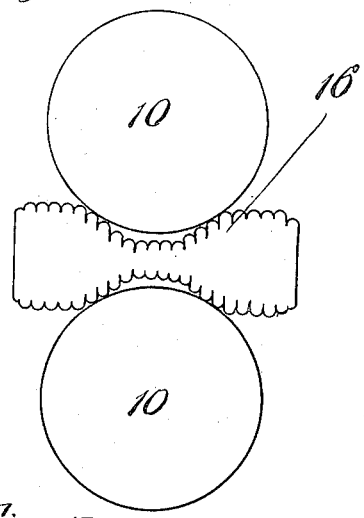
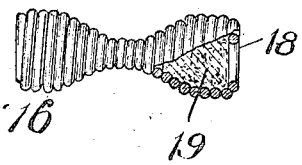
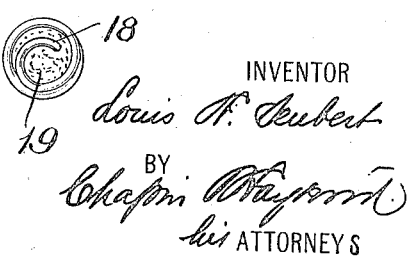
WITNESSES:
F. S. Andrews Jr.
F. Graves
INVENTOR
Louis H. Seubert
BY Chapin Wayman
his ATTORNEYS

UNITED STATES PATENT OFFICE.

LOUIS H. SEUBERT, OF EAST ORANGE, NEW JERSEY.

ANTIFRICTION-BEARING.

951,847.     Specification of Letters Patent.    Patented Mar. 15, 1910.

Application filed May 1, 1908. Serial No. 430,267.

*To all whom it may concern:*

Be it known that I, LOUIS H. SEUBERT, a citizen of the United States of America, and a resident of East Orange, county of Essex, and State of New Jersey, have invented certain new and useful Improvements in Antifriction-Bearings, of which the following is a specification, reference being had to the accompanying drawings, forming a part thereof.

This invention relates to improvements in anti-friction bearings, and particularly to anti-friction roller bearings in which separating rollers are employed for the purpose of separating the bearing rollers from each other so as to prevent the co-engagement of contiguous rollers. U. S. Patents No. 621,376 of March 21st, 1899 and No. 852,462 of May 7th, 1907 which have been issued to me are illustrative of the class of anti-friction bearings to which I refer.

My present invention relates particularly to a special form of separating roller employed in this class of bearing, such separating roller being flexible instead of rigid as heretofore. The roller may conveniently be composed of spirally wound wire, and is also preferably arranged to contain therein a wick and lubricating material. Such a separating roller has many advantages. In the first place, the flexibility enables the roller to compensate for any inequalities which may develop, and is useful moreover in facilitating the assemblage of the parts, second, a roller constructed of spirally wound wire is very much lighter than a solid roller of the same size; third, the surface of contact thereof with the bearing rollers and with the supplementary tracks is smaller; fourth, such a roller is very cheaply and easily constructed. This form of roller moreover lends itself to use of lubricating material in connection therewith. The wick saturated with lubricating material which I preferably provide in connection with the roller serves to feed just a sufficient amount of lubricating material to the bearing for the purpose of preventing it from running entirely dry, and yet distributes such a minute quantity at a time that the bearing so constructed seldom requires attention. Moreover, it will follow that as the wick remains after the lubricating material has been gradually used up, a fresh supply of oil merely squirted into the bearing will be quickly absorbed by such wicks so that the bearing will not be flooded with oil even though a considerable quantity be so applied; and the oil thus absorbed will again be given off in minute quantities as is required.

In the drawings:—Figure 1 is a view in central longitudinal section through a bearing embodying my invention. Fig. 2 is a view in central transverse section therethrough. Fig. 3 is a diagrammatic view illustrating the points of contact between two bearing rollers and the roller which separates them. Figs. 4 and 5 are detail views in side and end elevation of one of the separating rollers.

The bearing shown in Fig. 1 comprises a plurality of bearing rollers in the form of spheres 10 located between tracks 11 and 12, the former disposed upon the inner face of an outer bearing member or ring 13, and the latter disposed upon the outer face of an inner bearing member 14, which is mounted upon a shaft 15. The rollers 10 are separated from each other by means of separating rollers 16, the said separating rollers having rolling contact with contiguous faces of adjacent rollers. Supplementary tracks 17 are provided for guiding the said supplementary rollers. The said separating rollers are each composed of a single strip of wire spirally wound as is shown more particularly in detail in Figs. 4 and 5, the central portion of the roller being reduced so that the said rollers are substantially spool shaped, and the ends of the strips of wire being bent toward the center of the roller as is shown at 18 in order to form end heads, for the purpose of retaining a wick which is disposed within the roller. This wick is designated by the reference character 19 in the drawing and may be of any suitable absorbent material. The said wick is intended to be saturated with a lubricating material which will gradually feed through the interstices between the coils of which the rollers are composed, to the bearing rollers, for the purpose of continuously lubricating them.

What I claim is:

1. The combination with anti-friction roller bearings comprising a plurality of bearing rollers and bearing elements having tracks therefor, of separating rollers for the bearing rollers, said separating rollers composed throughout of spirally wound wire.

2. The combination with anti-friction roller bearings comprising a plurality of bearing rollers and bearing elements having tracks therefor, of separating rollers for the said bearing rollers, the said separating rollers composed of spirally wound cylindrical wire and having absorbent material contained within the coils thereof.

3. The combination with anti-friction roller bearings comprising a plurality of bearing rollers and bearing elements having tracks therefor, of separating rollers for the bearing rollers, the said separating rollers composed of spirally wound wire the ends of which are bent toward the center to form end heads, and absorbent material contained within the coils of the wire rollers and retained by the said end heads.

LOUIS H. SEUBERT.

Witnesses:
WILLIAM F. NUGENT,
LYMAN S. ANDREWS, Jr.